(12) United States Patent
Wurster et al.

(10) Patent No.: US 10,009,516 B2
(45) Date of Patent: Jun. 26, 2018

(54) METHOD OF MODIFYING A DATA SET CONTAINING COLOR COMPONENT VALUES

(71) Applicant: GMG GmbH & Co. KG, Tübingen (DE)

(72) Inventors: Jürgen Wurster, Dettenhausen (DE); Henning Kramer, Tübingen (DE)

(73) Assignee: GMG GMBH & CO. KG, Tübingen (DE)

( * ) Notice: Subject to any disclaimer, the term of this patent is extended or adjusted under 35 U.S.C. 154(b) by 0 days. days.

(21) Appl. No.: 15/343,370

(22) Filed: Nov. 4, 2016

(65) Prior Publication Data
US 2017/0142293 A1    May 18, 2017

(30) Foreign Application Priority Data
Nov. 4, 2015   (EP) .................................. 151929734

(51) Int. Cl.
H04N 1/60    (2006.01)
G06F 15/00   (2006.01)
G06K 1/00    (2006.01)
H04N 1/64    (2006.01)

(52) U.S. Cl.
CPC ......... H04N 1/6058 (2013.01); H04N 1/6008 (2013.01); H04N 1/646 (2013.01)

(58) Field of Classification Search
CPC ..... H04N 1/6058; H04N 1/6008; H04N 1/646
USPC .................................................. 358/1.9, 518
See application file for complete search history.

(56) References Cited

U.S. PATENT DOCUMENTS

2007/0211277 A1    9/2007  Kaneko et al.
2010/0157331 A1*   6/2010  Shestak ................ H04N 1/6058
                                                        358/1.9

FOREIGN PATENT DOCUMENTS

| DE | 102004003300 A1 | 8/2005 |  |
|---|---|---|---|
| EP | 1168825 A1 | 1/2002 |  |
| EP | 1524844 A2 * | 4/2005 | .............. H04N 1/52 |
| JP | 2004289201 A | 10/2004 |  |

* cited by examiner

*Primary Examiner* — Quang N Vo
(74) *Attorney, Agent, or Firm* — Harness, Dickey & Pierce, P.L.C.

(57) ABSTRACT

The invention relates to a method of modifying a data set containing color component values, which method allows the component of a color in a color spectrum that is provided to be generally set to zero and thus not to use that color. For this purpose, it is provided to first select an image area of a printed product, i.e. a portion of the data set. Further, it is determined which color from the color spectrum shall not be used. The color value for the selected image area is determined. A tolerance range around the color value is fixed. In a further step, it is determined which combinations of color component values that are formed of the remaining colors of the color spectrum include color values that are within the tolerance range fixed around the color value of the selected area. Thereafter, one of the combinations of the color component values is selected. Finally, the color component values are exchanged for the color component values from the selected combination of color component values in the selected portion of the data set.

Figure 1:
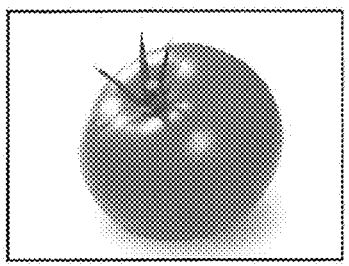
Figure 1:
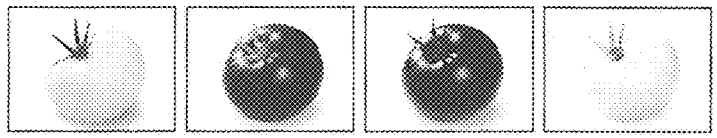
Figure 1:
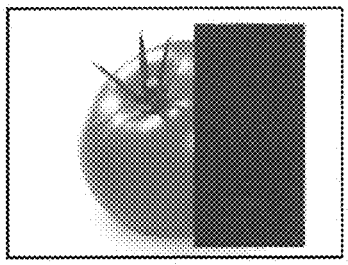

8 Claims, 1 Drawing Sheet
(1 of 1 Drawing Sheet(s) Filed in Color)

METHOD OF MODIFYING A DATA SET CONTAINING COLOR COMPONENT VALUES

The invention relates to a method of modifying color component values for a number of individual colors defining a color spectrum which are used in a data set for producing a printed product on a target printing machine.

It is known in prior art that printing machines produce printed products by sequentially transmitting different components of various individual colors. The final result of the total covered area then optically produces a specific color. This color can be measured using colorimetrical means and can be differentiated from other colors. The share of the individual color to be transmitted can be in the range between 0% and 100%.

It is known to produce data sets for driving corresponding printing machines, said data sets containing the respective percentage share of the individual ink to be used for each image pixel. The number of the colors to be used results in a color spectrum and the respective color component value is determined for every single printing dot and for every single color of the color spectrum. The corresponding color mixture resulting from overprinting finally produces the measurable color value.

It is known in prior art that at the representation of specific colors, hence at the production of specific color values, individual colors from the color spectrum that is used may adversely affect and adversely modify the entire color value. It is known, for example, that for the representation of color values representing the color brown, the use of the color cyan may be unfavorable because of its tendency to present the color green in the color impression as the dominant color.

Based on the above-described prior art, it is an object of the present invention to provide a method for modifying a data set containing color component values which allows the share of one or several colors in a color spectrum that is provided to be generally set to zero and hence not to use that color.

For the technical solution of this object, a method is proposed which comprises the features of patent claim 1. Further advantages and features will become apparent from the subclaims.

According to the invention, it is provided to first select an image area of the printed product, i.e. a portion of the data set. Furthermore, it is determined which individual colors shall not be used. The color component value for each image pixel is determined for the selected image area, and a tolerance range is fixed around the color component value.

Said tolerance range is a range around a color value or a color component value that can be fixed in terms of percentage or, for example, as a spacing in the L*a*b* color space. It defines a range around the respective color component value within which colors are present that are as close as possible to the color spectrum of the original image pixel.

In a further step, it is determined which combinations of color component values that are formed of the remaining individual colors include color component values that are as close as possible to the color spectrum of the original image pixel. Finally, the color component values are exchanged for the color component values from the selected combination of color component values in the selected portion of the data set.

The result is that one or several individual colors are not used, although finally the same optical or preferably similar color impression is produced in the printing process due to a different combination of color component values of the remaining colors.

Preferably, the color component values are available in the CMYK color space. Usually, the color component values of the individual colors are between 0% and 100%. Very low percentage ranges are not industrially reproducible, e.g. the range of >0% but <3%. The invention proposes that those combinations of color component values in which individual colors are within the exclusion zone, be excluded.

The same applies to the total ink application. This is what is known as TAC (total area coverage). The invention proposes that said TAC be limited upwardly, i.e. to exclude those combinations of color component values whose TAC exceeds the fixed TAC.

Advantageously, the selection of the data set area takes place based on a graphical digital presentation of the printed product using graphical means. In this case, simple software tools can be used for selecting a rectangular area for example. Any contoured image areas can be fixed by corresponding magnifications.

The invention provides a simple method that allows in printing-technological terms to abandon one or several individual colors for specific areas, for example, to abandon the color cyan in the CMYK color space. Within the predetermined area there are portions for CMYK; these correspond to a specific colorimetrically measurable color spectrum in the printed product which is represented for example by an L*a*b* value. Now, if the color cyan is set to zero, the color component value combinations of MYK are searched whose L*a*b* value is as close as possible to the original image pixel. Accordingly, an exchange is possible by selection, with the result that one particular color is completely abandoned, while the result is comparable or, in the optimal case, similar concerning the color values.

The patent or application file contains at least one drawing executed in color. Copies of this patent or patent application publication with color drawing(s) will be provided by the Office upon request and payment of the necessary fee.

Figure 2:
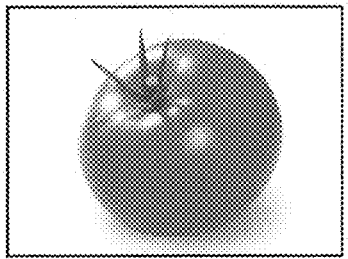
Figure 2:
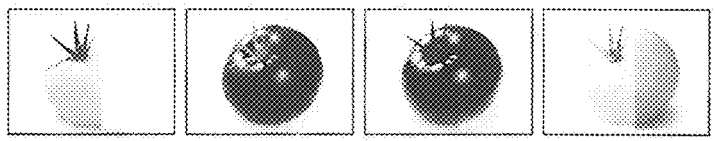

Further advantages and features will become apparent from the following description with reference to the attached drawing figures wherein it is shown by:

FIG. 1 the representation of a printed product;

FIG. 1*a, b, c, d* representations symbolizing color component values of the individual colors CMYK;

FIG. 2 the representation of a printed product according to FIG. 1 with a selected area;

FIG. 3 the representation of a printed product according to FIG. 1 after modification of the data set; and FIG. 3*a, b, c, d* representations symbolizing the color component values of the individual colors CMYK.

FIG. 1 shows as an exemplary printed product the representation of a tomato. This printed product has been produced based on an original data set including color component values for the colors CMYK. These are the colors cyan, magenta, yellow, and black. As shown by the FIGS. 1*a, b, c, d*, the image contains different percentages of the respective color at the individual pixels, which fact is symbolized in the individual images.

According to FIG. 2, a specific area of the visual representation shall be produced without using the color cyan.

In accordance with the method, the L*a*b* value is now determined for each image pixel in the area, which is not illustrated in the Figures. Then combinations of color component values are searched in which the share corresponds to C=0% and in which the L*a*b* value of the combination of the remaining three colors is however comparable to the original L*a*b* value or is very close to it. After the selection of a corresponding combination, the color component values in the data set are exchanged.

FIG. 3 now shows the printed product after modification of the data set, wherein the correspondingly modified components of the remaining colors can now be seen in the FIGS. 3a, b, c, d, while the color cyan is no longer present in the area. You see a higher share of the color black and also a corresponding share of the color magenta.

For example, if originally in the CMYK color component value combination C=30, M=50, Y=60, and K=20, a combination may be used with C=0, M=45, Y=60, and K=55 after the modification.

The described embodiment merely serves the purpose of explanation and is not in any way limiting.

The invention claimed is:

1. Method for modification of the color component values for a number of individual colors defining a color spectrum which are used in a data set for the production of a printed product on a target printing machine, wherein:
    a) a portion of the data set is selected which corresponds to a fixed image area of the printed product;
    b) the colorimetrically determinable color values are determined for the selected area;
    c) a tolerance range around the determined color values is fixed;
    d) one or several individual colors that shall not be used are determined, whereby the color component values thereof are set to zero;
    e) combinations of color component values are determined from the remaining individual colors whose color values are within said tolerance range and thus reproduce the original color spectrum as well as possible;
    f) the determined combinations of color component values are selected;
    g) the color component values in the selected area are exchanged for the selected color component combinations.

2. Method according to claim 1, wherein said color component values are set in the CMYK color space.

3. Method according claim 1, wherein said color component values are set in the L*a*b* color space.

4. Method according to claim 1, wherein in step f) combinations of color component values are excluded which contain color component values within a predetermined tolerance spectrum.

5. Method according to claim 4, wherein said tolerance spectrum is set in the range between 0% and an upper limit that is prescribed by industrial reproducibility.

6. Method according to claim 1, wherein said tolerance spectrum is formed by distance values lying in one color space.

7. Method according to claim 1, wherein in method step f) those combinations of color components are excluded which exceed a predetermined total area coverage value.

8. Method according to claim 1, wherein the selection of the portion of the data set according to method step a) takes place graphically using a digital presentation of the printed product.

* * * * *